United States Patent
Raszuk et al.

(10) Patent No.: US 7,532,631 B2
(45) Date of Patent: May 12, 2009

(54) METHOD AND APPARATUS FOR ACCELERATING BORDER GATEWAY PROTOCOL CONVERGENCE

(75) Inventors: Robert Raszuk, Komorow (PL); Rex E. Fernando, San Jose, CA (US); Himanshu Shah, Milpitas, CA (US); Keyur Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 707 days.

(21) Appl. No.: 11/106,414

(22) Filed: Apr. 13, 2005

(65) Prior Publication Data

US 2006/0233181 A1    Oct. 19, 2006

(51) Int. Cl.
*H04L 12/56* (2006.01)
(52) U.S. Cl. ........................ 370/401; 370/409
(58) Field of Classification Search ............ None
See application file for complete search history.

(56) References Cited

U.S. PATENT DOCUMENTS

| | | | |
|---|---|---|---|
| 6,538,416 B1 * | 3/2003 | Hahne et al. ........... | 370/431 |
| 6,999,454 B1 * | 2/2006 | Crump .................. | 370/389 |
| 7,035,202 B2 * | 4/2006 | Callon .................. | 370/216 |
| 2002/0131362 A1 | 9/2002 | Callon | |
| 2003/0099203 A1 | 5/2003 | Rajan et al. | |
| 2004/0039840 A1 * | 2/2004 | Dispensa et al. ....... | 709/242 |
| 2004/0196827 A1 | 10/2004 | Xu et al. | |
| 2005/0025118 A1 * | 2/2005 | Hao et al. .............. | 370/351 |

OTHER PUBLICATIONS

Bates, T. et al., "BGP Route Reflection An alternative to full mesh IBGP," Network Working Group, RFC 1966, Jun. 1996, 7 pages.
Bates, T. et al., "BGP Route Reflection—An alternative to full mesh IBGP," Network Working Group, RFC 2796, Apr. 2000, 10 pages.
Bates, T. et al., "Multiprotocol Extensions for BGP-4," Network Working Group, RFC 2858, Jun. 2000, 10 pages.
Chandra, R., et al., "BGP Communities Attribute," Network Working Group, RFC 1997, Aug. 1996, 5 pages.
Chandra, R. "Capabilities Advertisement with BGP-4," Network Working Group, RFC 3392, Nov. 2002, 6 pages.

(Continued)

*Primary Examiner*—Chi H. Pham
*Assistant Examiner*—Soon D. Hyun
(74) *Attorney, Agent, or Firm*—Hickman Palermo Truong & Becker LLP

(57) ABSTRACT

A method and apparatus are disclosed for accelerating Border Gateway Protocol (BGP) route convergence in an autonomous system. A virtual link identifier is assigned to each link of a set of communication links that are established between a BGP host and one or more network elements in one or more networks. For a particular link of the set of communication links, one or more routes that are reachable on the link are determined. The BGP host stores an association of the one or more routes with a BGP identifier of the BGP host and the virtual link identifier that is assigned to the particular link. The BGP host advertises the one or more routes to a BGP peer in a message, where the message includes the BGP identifier and the virtual link identifier.

39 Claims, 5 Drawing Sheets

OTHER PUBLICATIONS

Rekhter, Y., et al., "A Border Gateway Protocol 4 (BGP-4)," Network Working Group, RFC 1771, Mar. 1995, 51 pages.

Rosen, E. et al., "BGP/MPLS VPNS," Network Working Group, RFC 2547, Mar. 1999, 23 pages.

Walton, Daniel et al., "Advertisements of Multiple Paths in BGP," Network Working Group, draft-walton-bgp-add-paths-00.txt, May 2002, 8 pages.

International Searching Authority, "Notification of Transmittal of the International Search Report or the Declaration," PCT/US06/10141, dated Aug. 9, 2006, 6 pages.

Current Claims, PCT/US06/10141, 10 pages.

Request for Comments: 1122, Oct. 1989, Internet Engineering Task Force, 4 pages.

Fang, Luyuan et al., draft-ietf-13vpn-rt-constrain-01.txt, Sep. 2004, Network Working Group—Internet Draft, 14 pages.

Chen, Enke et al., draft-ietf-idr-dynamic-cap-04.txt, Feb. 2004, Network Working Group—Internet Draft, 12 pages.

State Intellectual Property Office of the People's Republic of China, "The First Office Action", filing No. 200680006778.7, dated Nov. 28, 2008, 5 pages.

Claims, filing No. 200680006778.7, 5 pages.

* cited by examiner

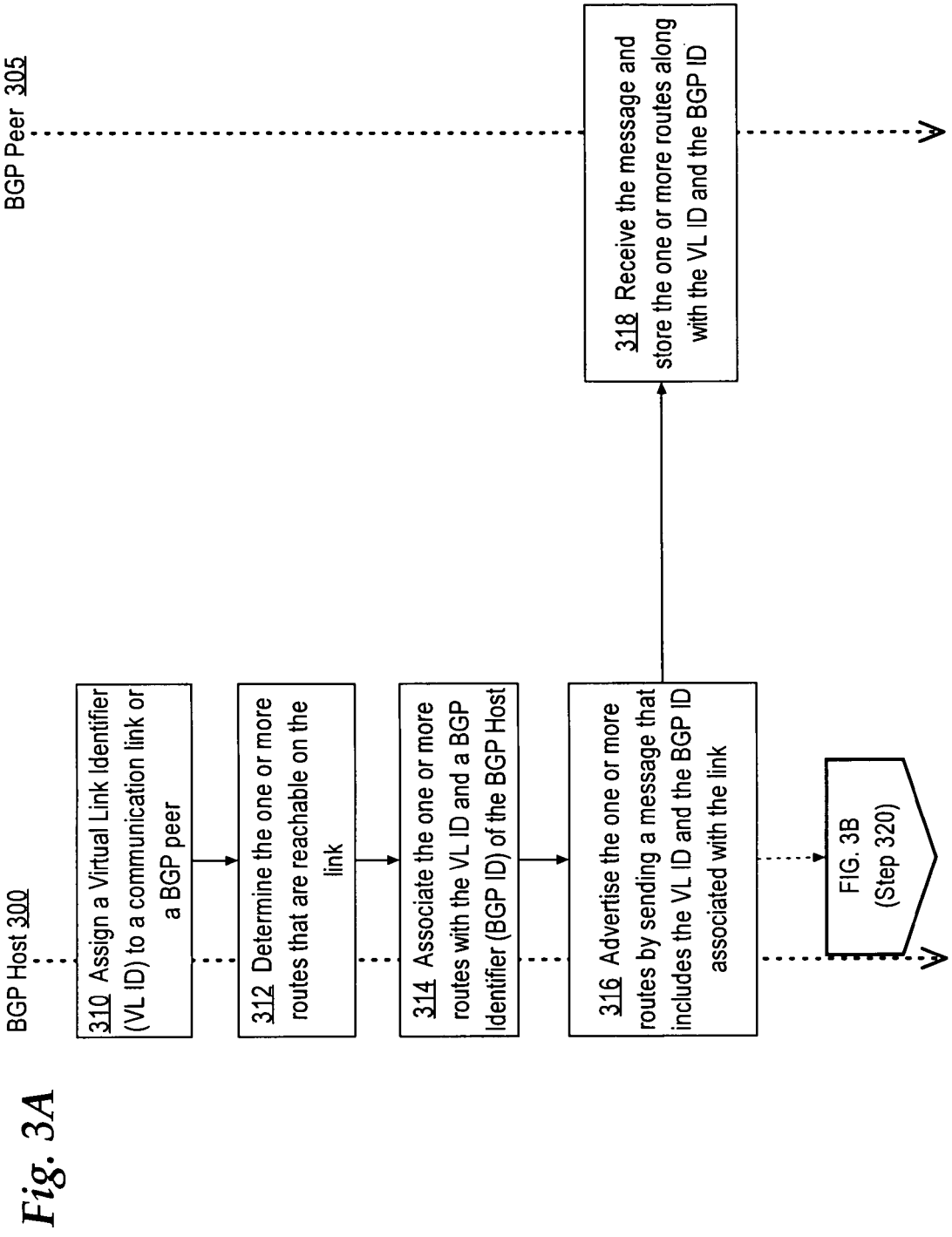

METHOD AND APPARATUS FOR ACCELERATING BORDER GATEWAY PROTOCOL CONVERGENCE

FIELD OF THE INVENTION

The present invention generally relates to managing network routing information. The invention relates more specifically to approaches for accelerating network route convergence among Border Gateway Protocol (BGP) hosts.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An Autonomous System (AS) is a network or group of networks under common administration and with common routing policies. A typical example of autonomous system is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

Usually, an autonomous system comprises network elements that are established on the edge of the system, and that serve as the system's ingress and egress points for network traffic. These network elements often, but not always, are routers and are referred to as Provider Edge (PE) network elements or as Autonomous System Border Routers (AS-BRs). An autonomous system may also include other network elements that are not used as ingress or egress points for network traffic, and these network elements are referred to as provider network elements. Similarly, a customer network may comprise network elements that are established on the edge of the network, and that are referred to as Customer Edge (CE) network elements.

In order to facilitate the routing of network traffic through one or more autonomous systems, the network elements of the autonomous systems need to exchange routing information to various network destinations.

Border Gateway Protocol (BGP) is an exterior gateway protocol (EGP) that is used to exchange routing information among network elements (usually routers) in the same or different autonomous systems. A computer host that executes a BGP process is typically referred to as a BGP host or a BGP device. In order to exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The BGP routing information includes the complete route to each network destination that is reachable from a BGP host. A route comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

In another example, Virtual Private Network (VPN) addressing schemes may use a route distinguisher (RD) in addition to the address prefix in order to distinguish between different routes to the same address destination. For example, in a VPN address destination of "10:9.2.0.2/16", "10" is a route distinguisher that identifies a specific VPN route to the "9.2.0.2/16" network.

The information that describes the path to the address destination in a BGP route includes, but is not limited to, an ORIGIN attribute, an AS_PATH attribute, and a NEXT_HOP attribute. The ORIGIN attribute indicates how a BGP process learned about a particular route. The value of the ORIGIN attribute for a particular route may indicate that the route was learned from an Interior Gateway Protocol (IGP), from an EGP, such as external BGP (eBGP), or that the origin of the route is unknown or learned in some other way.

The AS_PATH attribute indicates the list of autonomous systems that must be traversed in order to reach the address destination. For example, an AS_PATH attribute of "130 120" for a route indicates that the route to the address destination passes through autonomous systems 120 and 130 in that order.

The NEXT_HOP attribute for a particular route contains the address of a network element that is the next hop to the address destination. For example, the NEXT_HOP attribute for a route that is received from an eBGP peer is the network address of the eBGP peer. In another example, a PE BGP host that advertises a VPN route will include its own network address as the NEXT_HOP attribute for the VPN route it advertises.

BGP peers exchange, or advertise, routes in BGP UPDATE messages. Under the BGP-4 standard described in RFC1771, which was published by the Internet Engineering Task Force (IETF) in March 1995 and which defines the mechanism for exchanging IPv4 routes, a BGP UPDATE message includes a message header, and some or all of the following fields:

(1) Unfeasible Routes Length—the length of the Withdrawn Routes field;

(2) Withdrawn Routes—the address prefixes of the routes being withdrawn from service;

(3) Total Path Attribute Length—the length of the Path Attribute field;

(4) Path Attributes—the attributes of the routes advertised in the BGP UPDATE message including, but not limited to, the NEXT_HOP attribute, the ORIGIN attribute, and the AS_PATH attribute;

(5) Network Layer Reachability Information (NLRI)—the address prefixes of feasible routes being advertised in the BGP UPDATE message.

In BGP-4, feasible, or reachable, routes are advertised between BGP peers in a BGP UPDATE message. The BGP UPDATE message carries the address prefixes of the routes in the NLRI field of the message. The different attributes of the routes, such as the ORIGIN, NEXT_HOP, and AS_PATH attributes are carried in the Path Attribute field of the BGP UPDATE message. All routes advertised in the same BGP UPDATE message share the same path attributes.

When a BGP host determines that a particular address destination is unavailable for whatever reason, the BGP host must withdraw all routes it has advertised as reachable through this unavailable address destination. The BGP host withdraws the routes by sending a BGP UPDATE message to its BGP peers. The BGP UPDATE message includes all the address prefixes of the routes being withdrawn in the Withdrawn Routes field as <length,prefix> tuples, where <length> is the length in bits of the associated <prefix>. The Unfeasible Routes Length field of the BGP UPDATE message includes the total length of the Withdrawn Routes field. The Path Attributes field and the NLRI field are blank or not included in the message. Thus, under the BGP-4 standard, in order to withdraw the unfeasible routes, a BGP host must include in the BGP UPDATE message all of the prefixes of the routes being withdrawn.

The same mechanism for withdrawing unfeasible routes is used in the Multiprotocol Extensions to BGP-4 (MP-BGP) protocol, which enables BGP-4 to carry routing information for multiple Network Layer protocols (e.g., Internet Protocol version 6 (IPv6), Internetwork Packet eXchange (IPX), VPN-IPv4, VPN-IPv6, etc.) MP-BGP is described in RFC2858, which was published by IETF in June 2000.

Specifically, MP-BGP provides a special path attribute, MP_UNREACH_NLRI, which includes a Withdrawn Routes field that stores the address prefixes of the withdrawn routes in <length,prefix> tuples. The MP_UNREACH_NLRI path attribute also includes an Address Family Identifier (AFI) field for storing the identify of the Network Layer protocol of the withdrawn routes, and a Subsequent Address Family Identifier (SAFI) field for storing additional information about the type of the Network Layer Reachability Information carried in the attribute. Most significantly, however, regardless of the address family of the routes being withdrawn (e.g. IPv6, IPX, VPN-IPv4, VPN-IPv6, etc.), the MP-BGP UPDATE message must include the address prefixes of all routes being withdrawn.

One disadvantage of this mechanism of withdrawing unfeasible routes is that it is not practical for large-scale use. For example, if a BGP host in an AS detects that a PE router in a neighboring AS has failed, the BGP host must withdraw every route that was reachable through the failed PE. Since the failed PE router may have provided reachability for thousands if not tens of thousands of routes, depending on the number of unique path attributes among all routes the BGP host may have to generate and transmit through the AS network a large number of BGP UPDATE messages that advertise separately the address prefixes associated with the each unique set of path attributes. The effect of transmitting a large number of BGP UPDATE messages will likely be decreased network bandwidth and will likely result in severe network traffic congestions. The network performance will further be degraded because every BGP peer that also forwards traffic will be slowed down since it must process the BGP UPDATE messages by reading and withdrawing from its routing tables every address prefix sent in the messages.

Furthermore, since a particular AS may have multiple BGP hosts and may provide transit network traffic services to other ASs, the multiple BGP hosts should have consistent information in their routing tables. Usually, the multiple BGP hosts in the AS use a common set of policies to arrive at an agreement as to which BGP hosts will serve as ingress and egress points for particular routes to other networks or ASs. It is desirable that this process, also known as BGP route convergence, takes as little time as possible in order to provide faster transit traffic services to other ASs.

However, if a large number of routes must be withdrawn, the existing route withdrawal mechanism in BGP will slow down the rate of convergence of routing information among the multiple BGP hosts in the AS. Since each BGP host must process a large number of BGP UPDATE messages and must identify and withdraw each route based on the address prefix of the route, it may take a long while before the BGP hosts can synchronize their routing tables and the routing information included therein.

Based on the foregoing, there is a clear need for techniques that overcome the disadvantages of the BGP route withdrawal mechanism described above.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates an overview of one embodiment of a method for accelerating BGP route convergence;

DETAILED DESCRIPTION

Figure 1:
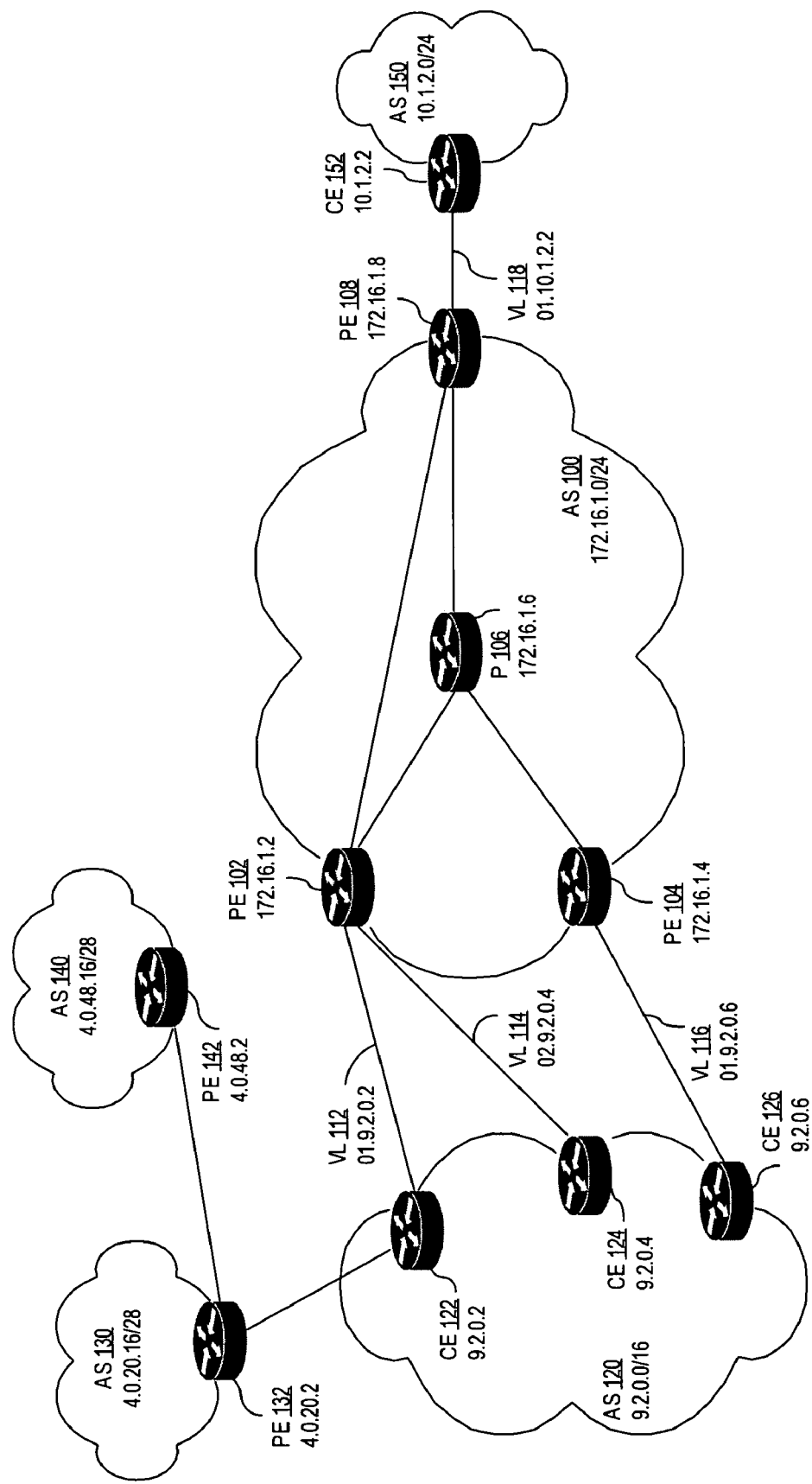
FIG. 1 is a block diagram that illustrates an overview of an autonomous system in which an embodiment may be implemented.

A method and apparatus for accelerating Border Gateway Protocol (BGP) route convergence is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overviews
   2.1 Structural Overview
   2.2 Functional Overview
3.0 Method of Accelerating BGP Route Convergence
   3.1 Assigning Virtual Link Identifiers to Communication Links
   3.2 Associating VL Identifiers and BGP Identifiers with BGP Routes
   3.3 Advertising BGP Routes
   3.4 Detecting Communication Link Failures
   3.5 Processing Withdrawn BGP Routes
4.0 Implementation Mechanisms - Hardware Overview
5.0 Extensions and Alternatives 1.0 General Overview The needs identified in the foregoing Background, and other needs and objects that will become apparent for the following description, are achieved in the present invention, which comprises, in one aspect, a method for identifying routes in BGP hosts. A virtual link identifier is assigned to each link of a set of digital communication links that are established between a BGP host and its one or more BGP peers. For a particular link of the set of digital communication links, the one or more routes that are reachable on the link are determined. The BGP host then stores, in electronic digital memory, an association of the one or more routes with a BGP identifier of the BGP host and the particular virtual link identifier that is assigned to the particular link.

In one feature, the aspect further comprises advertising the one or more routes from the BGP host to a BGP peer of the one or more BGP peers in a first BGP message that includes the BGP identifier and the particular virtual link identifier. The aspect may further comprise sending to the BGP peer a second BGP message, which indicates that the one or more routes are withdrawn and which includes the BGP identifier and the particular virtual link identifier.

In a feature of this aspect, the particular link can be a logical transport connection or a physical medium transport connection.

In a different aspect, a method for accelerating route convergence in autonomous systems using BGP is described. At a BGP host, separate virtual link identifiers are assigned to each link of a set of communication links established between the BGP host and one or more network elements in one or more networks. The routes that are reachable on a particular link of the set of communication links are then determined and stored. The one or more routes are then associated with a BGP identifier and a virtual link identifier, where the BGP identifier identifies the BGP host and the virtual link identifier is assigned to the particular link. The BGP host advertises the one or more routes to a BGP peer in a first message, where the first message includes the BGP identifier and the virtual link identifier. The BGP host then monitors and determines whether the particular link has become unavailable. In response to the BGP host determining that the particular link has become unavailable, the BGP host sends to the BGP peer a second message. The second message indicates that the one or more routes are withdrawn and includes the BGP identifier and the virtual link identifier.

In a feature of this aspect, the one or more routes are each associated with separate address prefixes, and the second message does not include any address prefix associated with the one or more routes.

In one feature of the aspect, the BGP peer receives the second message. Based on the BGP identifier and the virtual link identifier, the BGP peer then withdraws the one or more routes.

In a feature of the aspect, each route of the one or more routes is associated with an address prefix. In advertising the one or more routes, the BGP host includes in the first message the address prefix associated with each route. In response to receiving the first message, the BGP peer stores the one or more routes in a routing table. For each route, the BGP peer records the address prefix associated with the route, the BGP identifier, and the virtual link identifier. In response to receiving the second message, the BGP identifies the one or more routes based only on the BGP identifier and the virtual link identifier, and withdraws the one more routes. The BGP peer withdraws the routes by deleting the one or more routes from the routing table, or by setting a status code for each route, where the status code indicates that each route is withdrawn.

In this feature, the BGP peer may be a route reflector that receives the first and the second messages from the BGP host, and sends a third message to a BGP peer of its own, where the third message indicates that the one or more routes are withdrawn. The BGP route reflector may include in the third message the BGP identifier and the virtual link identifier that were received in the second message, or the BGP peer may include the address prefix associated with each route of the one or more withdrawn routes.

In a feature of this aspect, the first message is a BGP UPDATE message. In this feature, the BGP identifier and the virtual link identifier are stored in a path attribute field of the BGP UPDATE message.

In one feature of this aspect, the one or more routes may be reachable on more than one communication links. In this feature, the BGP host associates the one or more routes with the BGP identifier and the virtual link identifier of a communication link that is different than the particular link. The BGP host advertises this virtual link identifier in the first message along with the virtual link identifier of the particular link.

In a feature of this aspect, as part of establishing a BGP session, the BGP host and the BGP peer negotiate an accelerated BGP convergence capability, which is defined by an Address Family Identifier (AFI) value and a Subsequent Address Family Identifier (SAFI) value. In this feature, the second message sent from the BGP host, which indicates that the one or more routes are withdrawn, includes the AFI value and the SAFI value. The second message may also be a BGP UPDATE message.

In one feature of this aspect, a BGP extended community attribute is used to guard against an attempt by the BGP peer to process out of sequence any messages that are sent by the BGP host. In this feature, a message counter is stored in a path attribute field of any message sent by the BGP host, and the message counter is incremented for every message sent by the BGP host. In response to receiving a particular message, the BGP peer determines whether it has already stored the routes advertised in the particular message. If the routes advertised in the particular message are not stored at the BGP peer, then the BGP peer stores the value of the message counter in a routing table and associates the value of the message counter with the one or more routes advertised in the particular message. If the routes advertised in the particular message are stored at the BGP peer, then the BGP peer drops the particular message if the value of the message counter received in the particular message is lower than the value of the message counter that is stored in the routing table for the one or more routes advertised in the particular message. In this feature, the particular message may be any one of the first message and the second message, and the path attribute field may be a BGP extended community attribute field.

In a feature of this aspect, the BGP peer is established in a different autonomous system than the BGP host, and at least one of the steps of advertising the one or more routes and sending the second message is performed over an eBGP transport connection established between the BGP host and the BGP peer. In this feature, the BGP session established between the BGP host and the BGP peer may be configured to disallow changing the next hop attribute values associated with any routes that are advertised between the BGP host and the BGP peer during the session. In a different feature of this aspect, the BGP peer is established in the same autonomous system as the BGP host, and at least one of the steps of advertising the one or more routes and sending the second message to the BGP peer is performed over an Internal Gateway Protocol (IGP) transport connection. In this feature, at least one of the steps of advertising the one or more routes and sending the second message to the BGP peer may also be performed over an internal Border Gateway Protocol (iBGP) transport connection.

In one feature of this aspect, each route of the one or more routes can be an IPv4 route, an IPv6 route, or a VPN route.

In a feature of this aspect, the BGP peer is a BGP route reflector, and the one or more routes include a first route to a particular address destination. In this feature, the BGP peer receives a third message that advertises a second route to the particular address destination, which second route is different than the first route. The BGP peer then re-advertises both the first route and the second route to its BGP peering neighbors.

In a feature of this aspect, upon receiving the second message, the BGP peer withdraws the one or more routes by identifying the one or more routes based only on the BGP identifier.

In one feature of the aspect, the BGP host runs a plurality of BGP instances. In this feature, the BGP host associates the one or more routes with a plurality of distinct BGP identifiers, where each distinct BGP identifier corresponds to a distinct BGP instance.

In a feature of the aspect, the virtual link identifier comprises a first portion and a second portion. The first portion uniquely identifies a network interface of the BGP host, and the second portion identifies a network element that is connected to the network interface over the particular link. In this feature, upon receiving the second message, the BGP peer withdraws the one or more routes by identifying them based only on the first portion of the virtual link identifier.

In one feature of the aspect, the BGP host may determine whether the particular link has become unavailable by: (a) detecting whether a BGP instance running on the BGP host has become unavailable; (b) detecting whether a transport connection over which the particular link is established has failed; and/or (c) detecting whether the particular network element to which the particular link is established has failed.

In other aspects, the invention encompasses a computer apparatus and a computer-readable medium configured to carry out the foregoing steps.

2.0 Structural and Functional Overviews

2.1 Structural Overview

FIG. 1 is a block diagram that illustrates an overview of an autonomous system in which an embodiment may be implemented. For the purposes of showing a clear example, it is presumed that all network elements depicted in FIG. 1 are routers running at least one BGP process. Furthermore, for the purposes of illustration, FIG. 1 describes an embodiment with respect to IPv4 family of addresses and presents specific addresses. From the description that follows, however, it will be apparent that the network elements upon which an embodiment may be implemented need not be routers, and that embodiments may be implemented with respect to any family of network addresses. Thus, the specific topology and address data in FIG. 1 is just one example of the broad techniques described herein.

Autonomous System (AS) 100 includes Provider Edge (PE) router 102, PE 104, and PE 108. AS 100 is a network identified by address prefix "172.16.1.0/24". PE 102 is assigned an address of "172.16.1.2", PE 104 is assigned and address of "172.16.1.4", and PE 108 is assigned an address of "172.16.1.8". Provider (P) router 106 is internal to AS 100, and is assigned an address of "172.16.1.6".

PE 108 has established a connection to Customer Edge (CE) router 152 in AS 150. AS 150 is identified by address prefix "10.1.2.0/24", and CE 152 is assigned an address of "10.1.2.2". PE 102 has established connections to CE 122 and CE 124 in AS 120. PE 104 has established a connection to CE 126, which is also in AS 120. AS 120 is identified by address prefix "9.2.0.0/16", and CE 122, CE 124, and CE 126 are assigned addresses of "9.2.0.2", "9.2.0.4", and "9.2.0.6", respectively.

CE 122 has established connection to PE 132 in AS 130, which is a remote AS from the perspective of AS 100. AS 130 is identified by address prefix "4.0.20.16/28", and PE 132 is assigned an address of "4.0.20.2". PE 132 has established connection to PE 142 in remote AS 140. AS 140 is identified by address prefix of "4.0.48.16/28", and PE 142 is assigned an address of "4.0.48.2".

According to one embodiment, PE 102 assigns a Virtual Link (VL) identifier of "01.9.2.0.2" to communication link VL 112 that PE 102 has established to CE 122. Similarly, PE 102 assigns a VL identifier of "02.9.2.0.4" to communication link VL 114 that PE 102 has established to CE 124. In a similar manner, PE 104 assigns a VL identifier of "01.9.2.0.6" to communication link VL 116 that PE 104 has established to CE 124, and PE 108 assigns a VL identifier of "01.10.1.2.2" to communication link VL 118 that PE 108 has established to CE 152.

PE 102 also determines that routes to networks "4.0.40.16/28", "4.0.48.16/28", and "9.2.0.0/16" can be reached on VL 112, and that a route to network "9.2.0.0/16" can also be reached on VL 114. Similarly, PE 104 determines that the route to network "9.2.0.0/16" can be reached on VL 116, and PE 108 determines that the route to network "10.1.2.0/24" that can be reached on VL 118.

PE 102 associates the routes reachable on VL 112 (i.e. the routes to "4.0.40.16/28", "4.0.48.16/28", and "9.2.0.0/16") with a BGP identifier of the BGP process running on PE 102, and with the VL identifier of VL 112. In the example of FIG. 1, the network address of PE 102 ("172.16.1.2") is used as the BGP identifier. Thus, the routes to "4.0.20.16/28", "4.0.48.16/28", and "9.2.0.0/16" reachable on VL 112 are associated with the <172.16.1.2:01.9.2.0.2> tuple. Similarly, PE 102 associates the route to "9.2.0.0/16" reachable on VL 114 with the <172.16.1.2:02.9.2.0.4> tuple.

In a similar manner, PE 104 associates the route to "9.2.0.0/16" reachable on VL 116 with the <172.16.1.4:01.9.2.0.6> tuple, and PE 108 associates its route to "10.1.2.0/24" with the <Local:01> tuple.

In this embodiment, PE 102 establishes separate BGP sessions with P 106 and PE 108. Upon establishing the BGP sessions, PE 102 advertises to P 106 and PE 108 the routes that can be reached on VL 112 and VL 114, where the advertisements include the <BGP Identifier:VL Identifier> tuple associated with the routes. PE 104 establishes a BGP session with P 106, which in turn establishes a BGP session with PE 108. Similarly to PE 102, PE 104 advertises to P 106 the routes it can reach on VL 116, where the advertisement includes the <BGP Identifier:VL Identifier> tuple associated with the route. P 106 then re-advertises (or reflects) the routes to PE 108, where the re-advertisement message also includes the <BGP Identifier:VL Identifier> tuple associated with the route.

Table 1 illustrates a portion of a BGP routing table in PE 108 at a time when all routes supported by any router in AS 100 have been properly advertised and received by the other routers, i.e. at a time when all routes supported in AS 100 are fully convergent. As depicted in Table 1, PE 108 has stored in the table the path attributes of the routes, including the <BGP Identifier:VL Identifier> tuples associated with the routes.

TABLE 1

A BGP Routing Table at PE 108 In Fully Convergent State

| Status | Prefix | Next Hop | Path | Virtual Link |
|---|---|---|---|---|
| ... | ... | ... | ... | ... |
| * > i | 9.2.0.0/16 | 172.16.1.2 | e | 172.16.1.2:01.9.2.0.2 |
| * i | 9.2.0.0/16 | 172.16.1.2 | e | 172.16.1.2:02.9.2.0.4 |
| * > i | 4.0.20.16/28 | 172.16.1.2 | 120 e | 172.16.1.2:01.9.2.0.2 |
| * > i | 4.0.48.16/28 | 172.16.1.2 | 130 120 e | 172.16.1.2:01.9.2.0.2 |
| * i | 9.2.0.0/16 | 172.16.1.4 | e | 172.16.1.4:01.9.2.0.6 |
| * > | 10.1.2.0/24 | 10.1.2.2 | e | Local:01 |
| ... | ... | ... | ... | ... |

Status codes: * - valid, > - best, i - internal;
Path codes: i - IGP, e - EGP, ? - incomplete Suppose that at a next point in time CE 122 fails, and PE 102 detects the failure. PE 102 needs to withdraw the routes it advertised that are reachable through CE 122 (i.e. routes to networks "9.2.0.0/16", "4.0.20.16/28", and "4.0.48.16/28"). According to an embodiment, PE 102 sends a BGP UPDATE message to PE 108 (and to P 106). The BGP UPDATE message includes an MP_UNREACH_NLRI attribute that is defined specifically to support an Accelerated BGP Convergence capability. The Accelerated BGP Convergence capability is defined for an embodiment by a combination of particular AFI and SAFI values, say for example, AFI=n and SAFI=m.

The MP_UNREACH_NLRI attribute of the BGP UPDATE message indicates to PE 108 that it must withdraw the routes, and includes the <BGP Identifier:VL Identifier> tuple associated with the routes. Since CE 122 is the router that failed, and since PE 102 can reach CE 122 on VL 112, only the <172.16.1.2:01.9.2.0.2> tuple is included in the NLRI field of the MP_UNREACH_NLRI attribute. The values of all data fields of the MP_UNREACH_NLRI attribute are depicted in Table 2.

TABLE 2

MP_UNREACH_NLRI Attribute Field Values

```
+---------------------------------------+
| AFI = n                               |
+---------------------------------------+
| SAFI = m                              |
+---------------------------------------+
| NLRI = 172.16.1.2:01.9.2.0.2          |
+---------------------------------------+
```

Upon receiving the BGP UPDATE message, PE 108 processes the values in the fields of the MP_UNREACH_NLRI attribute of the BGP UPDATE message. PE 108 identifies the routes it needs to withdraw based on the <172.16.1.2:01.9.2.0.2> tuple included in the NLRI field of the MP_UNREACH_NLRI attribute. PE 108 then withdraws the identified routes. Table 3 depicts the state of the BGP routing table at PE 108 after withdrawing the routes.

TABLE 3

BGP Routing Table at PE 108 After Processing the MP_UNREACH_NLRI Attribute

| Status | Prefix | Next Hop | Path | Virtual Link |
|---|---|---|---|---|
| ... | ... | ... | ... | ... |
| --- | --- | --- | --- | --- |
| * i | 9.2.0.0/16 | 172.16.1.2 | e | 172.16.1.2:02.9.2.0.4 |
| --- | --- | --- | --- | --- |
| --- | --- | --- | --- | --- |
| * > i | 9.2.0.0/16 | 172.16.1.4 | e | 172.16.1.4:01.9.2.0.6 |
| * > | 10.1.2.0/24 | 10.1.2.2 | e | Local:01 |
| ... | ... | ... | ... | ... |

Status codes: * - valid, > - best, i - internal;
Path codes: i - IGP, e - EGP, ? - incomplete For the purposes of illustration, the withdrawn routes, which were previously reachable on VL 112 (i.e. the routes to networks "9.2.0.0/16", "4.0.20.16/28", and "4.0.48.16/28"), are replaced by dashed lines in Table 3. In one embodiment, PE 108 physically deletes the routes from the BGP routing table. In other embodiments, PE 108 withdraws the routes by setting the status code associated with the route to indicate that the route has been withdrawn, e.g. by removing the "*" sign from the Status Code associated with each withdrawn route.

In the embodiment described above, the BGP UPDATE message for withdrawing routes does not carry the address prefixes of all routes being withdrawn because all withdrawn routes are completely identified by their associated <BGP Identifier:VL Identifier> tuple. Further, identifying the withdrawn routes by using a BGP Identifier and a VL Identifier provides for reducing the size and the number of the BGP UPDATE message needed and enables a BGP peer to identify and process the routes being withdrawn in bulk.

2.2 Functional Overview

FIG. 3A is a flow diagram that illustrates an overview of one embodiment of a method for accelerating BGP route convergence between BGP host 300 and its BGP peer 305.

In step 310, a Virtual Link (VL) identifier is assigned to a communication link established between BGP host 300 and a network element in another network, which may be a BGP peer of BGP host 300. The one or more routes reachable on the link are determined in step 312. In step 314, BGP host 300 associates the one or more routes with a BGP identifier that identifies BGP host 300 and with the VL identifier associated with the link.

In step 316, BGP host 300 advertises the one or more routes by sending to BGP peer 305 a BGP UPDATE message that comprises, along with other information about the one or more routes, the BGP identifier and the VL identifier associated with the one or more routes. In step 318, BGP peer 305 receives the BGP UPDATE message and stores all information received for the one or more routes, including the BGP identifier and the VL identifier received in the message. BGP host 300 then proceeds to step 320 that is depicted in FIG. 3B.

Figure 3B:
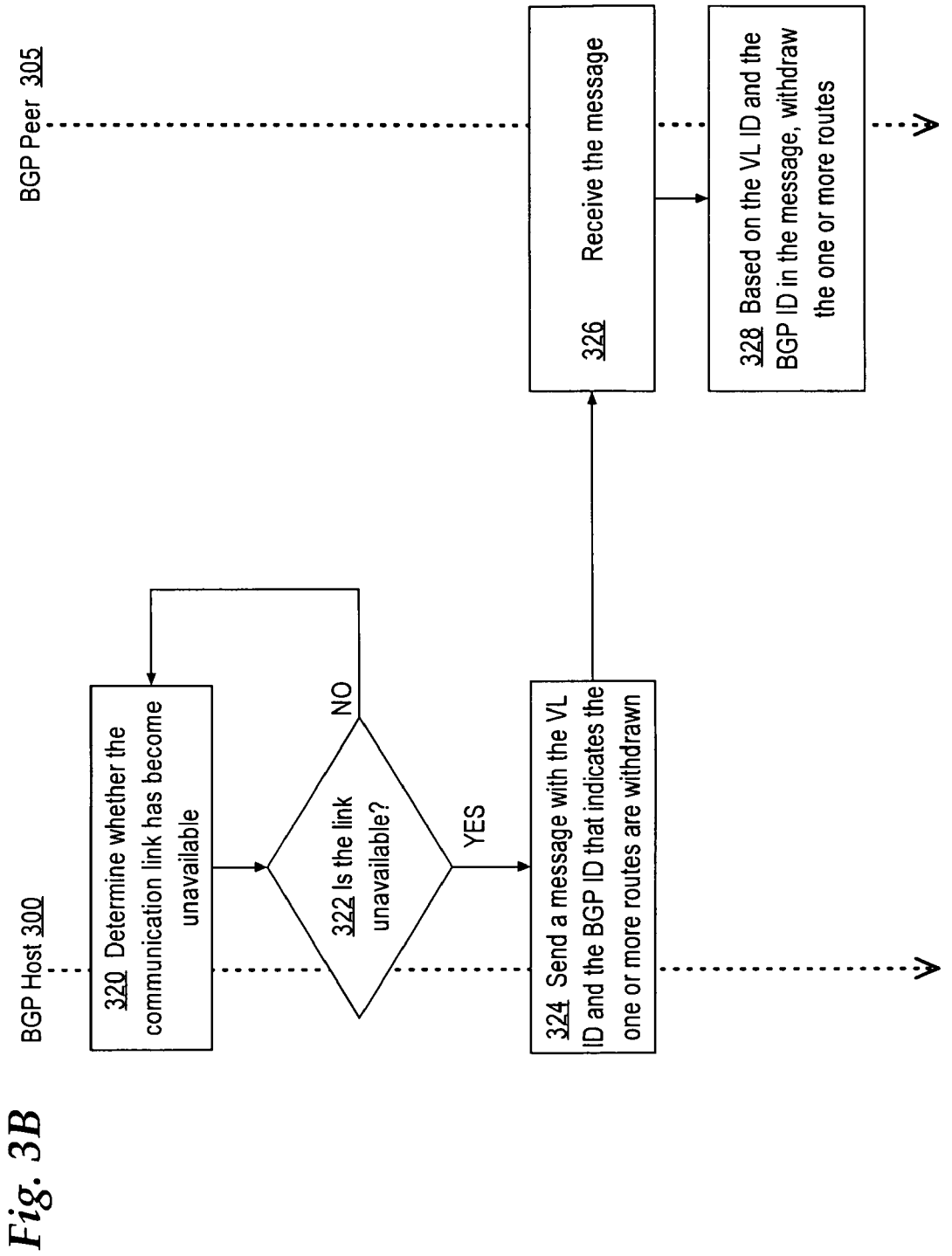
FIG. 3B is a flow diagram that is a continuation of the flow diagram illustrated in FIG. 3A.

Referring now to FIG. 3B, in step 320 BGP host 300 determines whether the communication link has become unavailable. BGP host proceeds to step 322 where it makes a determination of whether the link is unavailable. If in step 322 a determination is made that the link is not unavailable, BGP host proceeds back to step 320 and continues to monitor the availability of the link.

If in step 322 BGP host 300 determines that the link is unavailable, it proceeds to step 324. In step 324, BGP host 300 sends a BGP UPDATE message to BGP peer 305, which indicates that the one or more routes are withdrawn. The BGP UPDATE message includes the BGP identifier and the VL identifier.

In step 326 BGP peer 305 receives the BGP UPDATE message. BGP peer 305 then withdraws the one or more routes from its routing tables based on the BGP identifier and the VL identifier.

3.0 Method of Accelerating BGP Route Convergence 3.1 Assigning Virtual Link Identifiers to Communication Links In one embodiment, separate Virtual Link (VL) identifiers are assigned to each link of a set of communication links that are established between a BGP host and one or more network elements in one or more networks. A communication link is any physical or logical transport connection between the BGP host and another network element over which information can be exchanged.

For example, in an embodiment a communication link may be defined as the physical interface-to-interface transport connection established between a network interface on the BGP host and a network interface on a different network element. In one embodiment the communication link may be defined as a logical transport connection between a process executing on the BGP host and a process executing on the network element. In yet different embodiment, the communication link may be defined as a logical transport connection used by the BGP host and the network element as part of a VPN. In either of the last two embodiments, there may be more than one communication link that uses the same physical transport connection between the BGP host and the remote network element.

A software component may be used for assigning VL identifiers to communication links. Depending on the type of the communication links established between the BGP host and a network element in another AS, the software component may use a variety of mechanisms to create and assign unique and separate VL identifiers to each communication link. These mechanisms include, but are not limited to, using the network address of the network element as a VL identifier, using a combination of an identifier of the network interface on the BGP host and the network address of the network element as a VL identifier, or using a unique random number as the VL identifier. The techniques for accelerating BGP convergence described herein are not limited to employing any specific mechanism of assigning VL identifiers to communication links.

3.2 Associating VL Identifiers and BGP Identifiers with BGP Routes

In an embodiment, the one or more routes reachable on a particular link of the communication links are associated with the VL identifier of the link and with a BGP identifier of the BGP host.

If the BGP host executes a single BGP process, then the network address of the BGP host may be used as the BGP identifier. If the BGP host executes multiple BGP instances, then the distinct BGP router identifier of each BGP instance may be used as a BGP identifier. The techniques for accelerating BGP convergence described herein are not limited to any particular mechanism of creating and assigning BGP identifiers.

According to an embodiment, the BGP identifier and the VL identifier associated with each route, along with the other attributes of the route, are stored by the BGP host in a Routing Information Base (RIB). A BGP RIB usually includes three parts: (a) Adj-RIBs-In, which stores routes received from BGP peers or learned from other protocols, (b) Loc-RIB, which stores routes that the BGP host selected by applying its local policies to the routes stored in Adj-RIBs-In, and (c) Adj-RIBs-Out, which stores routes that the BGP host has selected for advertisement to its peers. The BGP RIB may be implemented as a single physical routing table that includes each of the three parts as separate logical tables, or as three separate physical routing tables. Thus, if a BGP host is configured to distribute routes with their associated BGP identifiers and VL identifiers, the BGP host stores the BGP identifier and the VL identifier for the routes at least in the BGP Adj-RIBs-Out table. Similarly, if a BGP host is configured to receive routes with their associated BGP identifiers and VL identifiers, the BGP host stores the BGP identifier and the VL identifier for the routes at least in the BGP Adj-RIBs-In table.

3.3 Advertising BGP Routes

In one embodiment, a BGP host advertises one or more routes to a BGP peer that is established in a different autonomous system than the BGP host. The BGP host advertises the one or more routes to the BGP peer in a BGP UPDATE message over an eBGP transport connection, where the BGP UPDATE message includes a BGP identifier of the BGP host and a VL identifier of the communication link on which the one or more routes can be reached. In this embodiment, the BGP session established between the BGP host and the BGP peer may be configured to disallow changing the next hop attribute values associated with any routes that are advertised between the BGP host and the BGP peer during the session.

In a different embodiment, the BGP peer is established in the same autonomous system as the BGP peer. In this embodiment, the BGP host may advertise one or more routes to the BGP peer over an iBGP transport connection. Alternatively or additionally, BGP routes may be advertised over an IGP transport connection. IGP transport protocols that may be used include, but are not limited to, Routing Information Protocol (RIP), Open Shortest Path First (OSPF) protocol, and Intermediate System-to-Intermediate System (IS-IS) protocol.

3.3.1 Accelerated BGP Convergence Capability

In one embodiment, a BGP host may advertise routes to its BGP peers over eBGP and/or iBGP. In this embodiment, an Accelerated BGP Convergence capability is negotiated between the BGP host and a BGP peer during the establishing of the BGP session between them. The Accelerated BGP Convergence capability may be defined by a combination of Address Family Identifier value and a Subsequent Address Family Identifier value. The mechanism for negotiating BGP capabilities between BGP peers is defined in RFC3392, which was published by IETF in November 2002.

A successfully negotiated Accelerated BGP Convergence capability indicates that the BGP host and the BGP peer are capable of identifying and processing routes based on a BGP identifier and a VL identifier. Once the BGP host and the BGP peer determine, during establishing the BGP session, that both support the Accelerated BGP Convergence capability, during the session the BGP host can advertise and withdraw routes based on the BGP identifier of the BGP host and the VL identifier associated with the communication link of the BGP host on which the routes can be reached.

3.3.2 BGP Virtual Link Path Attribute

In one embodiment, the BGP Virtual Link Path Attribute described herein is used to advertise routes according to the Accelerated BGP Convergence capability. Specifically, the BGP Virtual Link Path Attribute is a path attribute that is included in a BGP UPDATE message along with a MP_REACH_NLRI attribute.

The BGP Virtual Link Path Attribute of a BGP UPDATE message carries a BGP Identifier and one or more VL identifiers, and indicates that the BGP Identifier and the one or more VL identifiers are associated with the routes included in the NLRI field of the MP_REACH_NLRI attribute of the BGP UPDATE message.

Figure 2B:
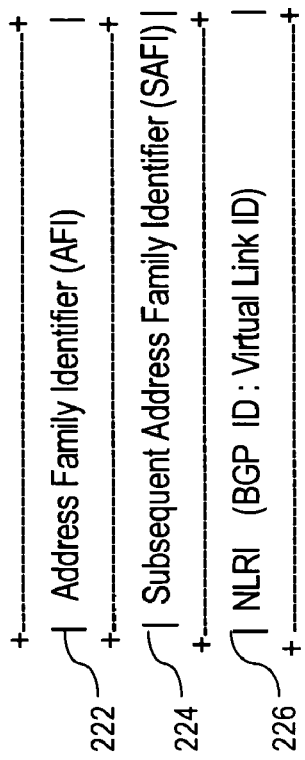
FIG. 2B is a block diagram that illustrates the format of a MP_UNREACH_NLRI Path Attribute according to one embodiment.
Figure 2A:
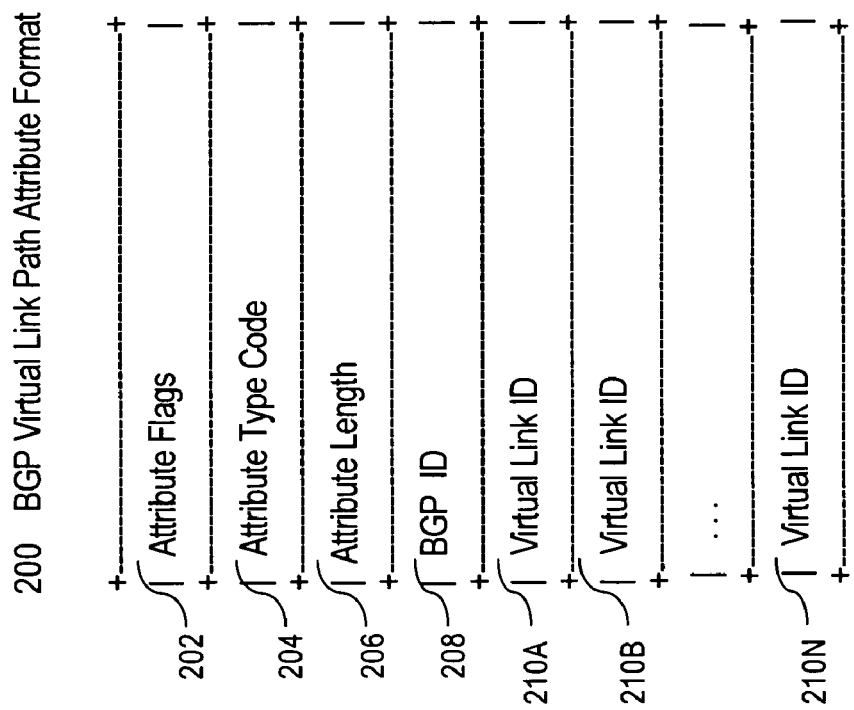
FIG. 2A is a block diagram that illustrates the format of a BGP Virtual Link Path Attribute according to one embodiment.

FIG. 2A is a block diagram that illustrates the format of a BGP Virtual Link Path Attribute according to one embodiment. BGP Virtual Link Path Attribute 200 comprises at least the following fields: Attribute Flags 202, Attribute Type Code 204, Attribute Length 206, BGP ID 208, and one or more Virtual Link IDs 210A, 210B, . . . , 210N, etc.

In one embodiment, Attribute Flags 202 is a bit-map in which each bit indicates a property of BGP Virtual Link Path Attribute 200. Attribute Type Code 204 is a field storing a pre-assigned value that uniquely distinguishes the BGP Virtual Link Path Attribute 200 from other BGP Path Attributes, such as, for example, ORIGIN, NEXT_HOP, and AS_PATH. Attribute Length 206 stores the total length, in octets, of a BGP Virtual Link Path Attribute that is included in a BGP UPDATE message.

BGP ID 208 is a field that stores the BGP identifier of the BGP host that sends the BGP message. The BGP identifier is a value that is determined by the BGP host as described above. In one embodiment implemented on a BGP host that is assigned an IPv4 address, the BGP identifier may be a 4 octet BGP router identifier. In a different embodiment implemented on a BGP host that is assigned an IPv6 address, the BGP identifier may be a 16 octet BGP router identifier. The techniques for accelerating BGP convergence described herein, however, do not depend on the specific mechanism of creating and assigning BGP identifiers, and a BGP host may utilize any suitable mechanism for creating unique BGP identifiers that is acceptable by other BGP hosts in the autonomous system.

A Virtual Link ID field in a BGP UPDATE message, such as fields 210A, 210B, or 210N, is used to carry a VL identifier that is associated with a communication link on which a particular route can be reached. In one embodiment, the VL identifier is a 6-octet value, in which 2 octets identify a particular line card of a BGP host, and 4 octets identify the network element to which the particular line card is communicatively connected. Assigning the VL identifier in this manner allows a BGP host to withdraw routes by advertising only a portion of the VL identifier in a BGP message. For example, if the BGP host detects that a particular line card has failed, the BGP host may withdraw the routes reachable through the particular line card by advertising in a BGP UPDATE message only the 2-octet value identifying the card along with the BGP identifier. Similarly, if the BGP host detects that the particular network element to which the card is connected has failed, the BGP host may withdraw the routes reachable through the particular network element by advertising in a BGP UPDATE message only the 4-octet value identifying the network element along with the BGP identifier.

In one embodiment, one or more routes stored in a routing table of a BGP host may be reachable on a plurality of communication links. In this embodiment, the BGP host associates the one or more routes with a BGP identifier of the BGP host and with the VL identifiers of all links in the plurality of communication links. The BGP host may advertise the one or more routes in a BGP UPDATE message that includes the BGP identifier in the BGP ID field (such as BGP ID 208) of the BGP Virtual Link Path Attribute, and the VL identifiers in a plurality of Virtual Link ID fields of the attribute (such as Virtual Link ID fields 210A, 210B, etc.).

3.3.3 Advertising Accelerated BGP Convergence Routes Through BGP Route Reflectors In some autonomous systems, not every peer establishes a BGP session with every other peer. In such autonomous systems, route reflection is used to distribute routing information. In route reflection, BGP peers are arranged in groups where one of the BGP peers acts as a BGP route reflector. The BGP route reflector receives routing information and re-advertises (or reflects) it to its BGP peers (or route reflection clients).

The routing information re-advertised by a BGP route reflector usually comprises routes received by the BGP route reflector from any of its BGP peers, and routing information learned from any other routing protocol. The BGP route reflector is configured to receive routes and to apply policy or configuration rules to the received routes before re-advertising the routes to its BGP peers. The BGP route reflector advertises only one route to a particular address destination, and this is usually the route selected as the "best" route. For example, a BGP route reflector may receive several different routes to a particular address destination from the same or different BGP peer. The BGP route reflector then determines the best route of the several different routes and re-advertises only this best route to its peers.

Re-Advertising Second Best Routes

The techniques for accelerating BGP convergence described herein may be implemented in an autonomous system that makes use of BGP routes reflectors to re-advertise routes. In an embodiment, a BGP route reflector receives a BGP UPDATE message that includes a BGP Virtual Link Path Attribute that associates one or more routes with a BGP identifier of the BGP host sending the message and a VL identifier identifying the communication link on which the one or more routes may be reached. The BGP route reflector then re-advertises the one or more routes to its BGP peers. In order to allow for faster switching decisions at its BGP peers, the BGP route reflector may advertise to its peers more than one route to a particular address destination.

For example, in one embodiment a BGP host advertises one or more routes to a BGP route reflector in a BGP UPDATE message. Along with the one or more routes, the message includes a BGP identifier of the BGP host and a VL identifier associated with the communication link on which the one or more routes can be reached. The one or more routes include a first route to a particular address destination. Thereafter, the BGP route reflector receives a BGP UPDATE message that advertises a second route to the particular address destination, where the second route is different than the first route. In order to provide for faster switching decision at its BGP neighbors in case one of the first route or second route to the particular address destination becomes unavailable, in this embodiment the BGP route reflector re-advertises both the first route and the second route to its BGP neighbors.

One example technique for advertising multiple routes to the same destination is described in draft-walton-bgp-add-paths-00.txt, submitted to IETF in May 2002. According to this technique, a BGP route reflector negotiates with its BGP peers an ADD_PATH capability before the BGP route reflector can re-advertise multiple routes to the same destination. Once the ADD_PATH capability has been negotiated with a BGP peer, the BGP route reflector can send to this peer multiple routes to the same address destination. The BGP route reflector usually sends the multiple routes in different BGP UPDATE messages. The BGP peer is able to distinguish and store the routes in its routing tables based on an arbitrary route identifier that is associated with each route and that is included in the NLRI field of a MP_REACH_NLRI attribute of the message. This technique for advertising multiple routes to a particular destination may be used in an embodiment of the present invention that uses BGP route reflectors to advertise routes with native IPv4 or IPv6 address prefixes. The technique may also be used in an embodiment that uses BGP route reflectors to re-advertise VPN routes.

Translating Accelerated BGP Convergence UPDATE Messages to Regular BGP UPDATE Messages In one embodiment, a BGP host sends to a BGP peer, which is acting as a BGP route reflector, a BGP UPDATE message that advertises one or more routes. The BGP UPDATE message includes a BGP identifier of the BGP host and a VL identifier of the communication link on which the one or more routes can be reached. Once the BGP peer has received and processed the one or more routes, the BGP peer may re-advertise the one or more routes to its peering BGP neighbors.

If a BGP neighbor of the BGP peer supports Accelerated BGP Convergence capability and if such capability has been negotiated between the BGP peer and its BGP neighbor upon establishing a BGP session, the BGP peer re-advertises the one or more routes in a BGP UPDATE message that includes the BGP identifier and the VL identifier associated with the routes. If the BGP neighbor does not support Accelerated BGP Convergence capability or if such capability was not negotiated between the BGP peer and the BGP neighbor, the BGP peer re-advertises the one or more routes to the BGP neighbor in a BGP UPDATE message that includes the address prefixes associated with each of the one or more routes. Thus, the BGP peer effectively translates the original BGP UDPATE message, in which the one or more routes were associated with a BGP identifier and a VL identifier, to a regular BGP UPDATE message that identifies the one or more routes by using their corresponding address prefixes.

3.3.4 Virtual Link Counter Path Attribute

Autonomous systems, in which BGP hosts are not fully meshed, may use a plurality of BGP route reflectors to advertise routes by using the Accelerated BGP Convergence capability. In such systems, a BGP peer may receive out of order any BGP UPDATE messages sent by the BGP host, because different BGP route reflectors may re-advertise the routes in the messages to the BGP peer with different delays. For example, a BGP host may sent two different messages advertising the same one or more routes. The BGP peer may receive and process the routes in the later-sent message before it receives the earlier-sent message. Thus, when the BGP peer receives the earlier-sent message it may find itself in a situation in which it may attempt to process the routes in the earlier-sent message even though the information about the routes in the message is no longer relevant.

In one embodiment a Virtual Links Counter Path Attribute is used to avoid this situation. The Virtual Links Counter Path Attribute may be defined as a BGP Extended Community Attribute according to the mechanism described in RFC1997, published by IETF in August 1996. The Virtual Links Counter Path Attribute includes a field storing a counter that is incremented every time a BGP UPDATE message that supports the Accelerated BGP Convergence capability is sent from a BGP host.

If a BGP peer receives a BGP UPDATE message with a Virtual Links Counter attribute for routes that it has not yet stored in its routing tables, the BGP peer stores the value of the counter field and associates the value of the counter field with the routes advertised in the BGP UPDATE message. Thereafter, in response to receiving a BGP UPDATE message with a Virtual Links Counter attribute, the BGP peer determines whether the routes in the message have already been stored. If the BGP peer determines that the routes have already been stored, the value of the counter field in the Virtual Link Counter attribute of the message is compared to the value of the counter stored for the routes. If the value of the received counter is lower, then the BGP peer drops the message because the information it carries for the stored routes is no longer relevant. If the value of the received counter is greater than the counter value associated with the stored routes, then the information in the message is processed and the counter value stored for the routes is updated with the value of the received counter.

In one embodiment, a window of Virtual Links Counter values is defined which indicates whether the sending BGP host is restarting the Virtual Links Counter values for the BGP UPDATE messages it sends. The Virtual Links Counter may be restarted because of an imminent counter field overflow, or for any other reason. For example, if a BGP host sends a particular BGP UPDATE message with a Virtual Links Counter value between 0 and 16, this means that the counter is restarted, and that the particular message and all subsequent messages should be processed by all BGP receivers as new messages considered to have Virtual Links Counter values greater than any values that may exist in the routing tables of the BGP receivers.

3.3.5 Advertising BGP Routes over IGP Protocols

In one embodiment, a BGP host uses an IGP protocol to advertise one or more routes to a BGP-enabled network element in the same autonomous system. The BGP-enabled network element is executing a BGP process, but a BGP session is not necessarily established between the BGP host and the network element. Regardless of the IGP protocol used, however, the BGP host includes in the advertisement a BGP identifier of the BGP host and a VL identifier associated with the communication link on which the one or more routes can be reached. The IGP protocol employed does not process any information associated with the routes, but instead passes it for processing to the BGP process executing on the network element.

In one embodiment, the IGP is the OSPF protocol. In this embodiment, the BGP host includes the BGP identifier and the VL identifier associated with the advertised routes in a Type-Length-Value (TLV) attribute of a Link State Advertisement (LSA). The LSA is included in an OSPF packet that may be sent from the BGP host to a number of network elements within the autonomous system. The BGP host may specify the scope of the route advertisements (i.e. the network elements to which the advertisements are sent) in the options attribute of the LSA.

In another embodiment, the IGP is the IS-IS protocol. In this embodiment, the BGP host includes the BGP identifier and the VL identifier associated with the advertised routes in a sub-TLV field of an IS-IS Capability TLV attribute. The IS-IS Capability TLV attribute is included in an IS-IS packet that is sent by the BGP host to one or more network elements in the same autonomous system. Similarly to OSPF, the BGP host may specify the scope of the route advertisement by setting the S-bit in the Flags field of the IS-IS Capability TLV attribute.

3.4 Detecting Communication Link Failures

In one embodiment, a BGP host determines whether a particular communication link, on which one or more routes can be reached, has become unavailable. The BGP host may make a determination about the unavailability of the particular communication link in a variety of failure situations including, but not limited to, failure of a CE network element to which the BGP host is communicatively connected, failure of a BGP host-to-CE or BGP host-to-PE transport connection, failure of the BGP instance executing on the BGP host, and failure of the BGP host itself.

The unavailability of a particular communication link may be determined in a variety of ways including, but not limited to, by using IGP hellos, by using Bi-directional Failure Detection (BFD), by using Multi-Access Reachability Protocol, by utilizing the Next Hop Tracking feature available on Cisco Systems, Inc. routers, by utilizing Cisco IOS IP Service Level Agreement (IPSLA)-based probing with object tracking enhancement available on Cisco Systems, Inc. routers, by detecting physical medium transport connection failures, and by using BGP KEEPALIVE messages between BGP peers. The techniques for accelerating BGP convergence described herein, however, are not limited to employing any specific mechanism for detecting communication link failures, and any mechanism that can determine the unavailability of a communication link may be utilized.

3.5 Processing Withdrawn BGP Routes

In one embodiment, during the establishing of a BGP session between a BGP host and a BGP peer negotiate an Accelerated BGP Convergence capability. In this embodiment, the BGP host advertises to the BGP peer one or more routes by including in a BGP UPDATE message a BGP Virtual Link path attribute along with other path attributes for the one or more routes, such as ORIGIN, AS_PATH, NEXT_HOP, and the NLRI attribute that carries the address prefixes for the routes. In response to receiving the BGP UPDATE message, the BGP peer stores in one or more of its routing tables all the information included in the message, including the BGP identifier and the one or more VL identifiers carried in the BGP Virtual Link path attribute.

In this embodiment, if the BGP host determines that a particular communication link that is associated with a particular VL identifier has failed, the BGP host sends to the BGP peer another BGP UPDATE message that includes an MP_UNREACH_NLRI path attribute that is defined for the Accelerated BGP Convergence capability.

FIG. 2B is a block diagram that illustrates the format of a MP_UNREACH_NLRI Path Attribute according to this embodiment. MP_UNREACH_NLRI Path Attribute 220 includes Address Family Identifier (AFI) field 222, Subsequent Address Family Identifier (SAFI) field 224, and NLRI field 226. As described herein in the subsection discussing the Accelerated BGP Convergence capability, AFI field 222 and SAFI field 224 store values which indicate that a particular MP_UNREACH_NLRI attribute included in a message carries information associated with one or more routes according to the Accelerated BGP Convergence capability.

NLRI field 226 includes a <BGP Identifier: VL Identifier> tuple that is associated with one or more routes. In one embodiment, the BGP Identifier value is a BGP router identifier having length of 4 or 16 octets. The VL Identifier value is 6-octet value that is assigned to a communication link on which the one or more routes can be reached.

In an embodiment, a BGP peer receives from a BGP host a BGP UPDATE message that includes a MP_UNREACH_NLRI path attribute in the format of MP_UNREACH_NLRI Path Attribute 220. The BGP peer identifies one or more routes that are stored in one or more of its routing tables based only on the BGP identifier value and the VL identifier value that are included in the NLRI field of the MP_UNREACH_NLRI attribute. The BGP peer then withdraws the identified one or more routes from service. The BGP peer may withdraw the one or more routes by setting a status code associated with each route of the one or more routes, where the status code for each route indicates that the route is not feasible. Alternatively, after identifying the one or more routes based on the BGP identifier value and the VL identifier value, the BGP peer may delete the one or more routes from its routing tables.

In one embodiment, a BGP host may need to perform a graceful shut down. Prior to shutting down, the BGP host sends to its BGP peer a BGP UPDATE message in which the NLRI field of the MP_UNREACH_NLRI attribute includes the BGP identifier of the BGP host, and includes a special value as the VL identifier. The special value may be any value that is not associated with a communication link, such as, for example, the value of "0" or "NULL". Using such a special value for the VL identifier signals to the BGP peer that all routes associated with the BGP identifier, regardless of their associated VL identifiers, are withdrawn (because, presumably, the BGP host needs to shut down). In response to receiving the BGP UPDATE message from the BGP host, the BGP peer identifies and withdraws all routes stored in one or more of its routing tables based only on the received BGP identifier.

4.0 Implementation Mechanisms—Hardware Overview

Figure 4:
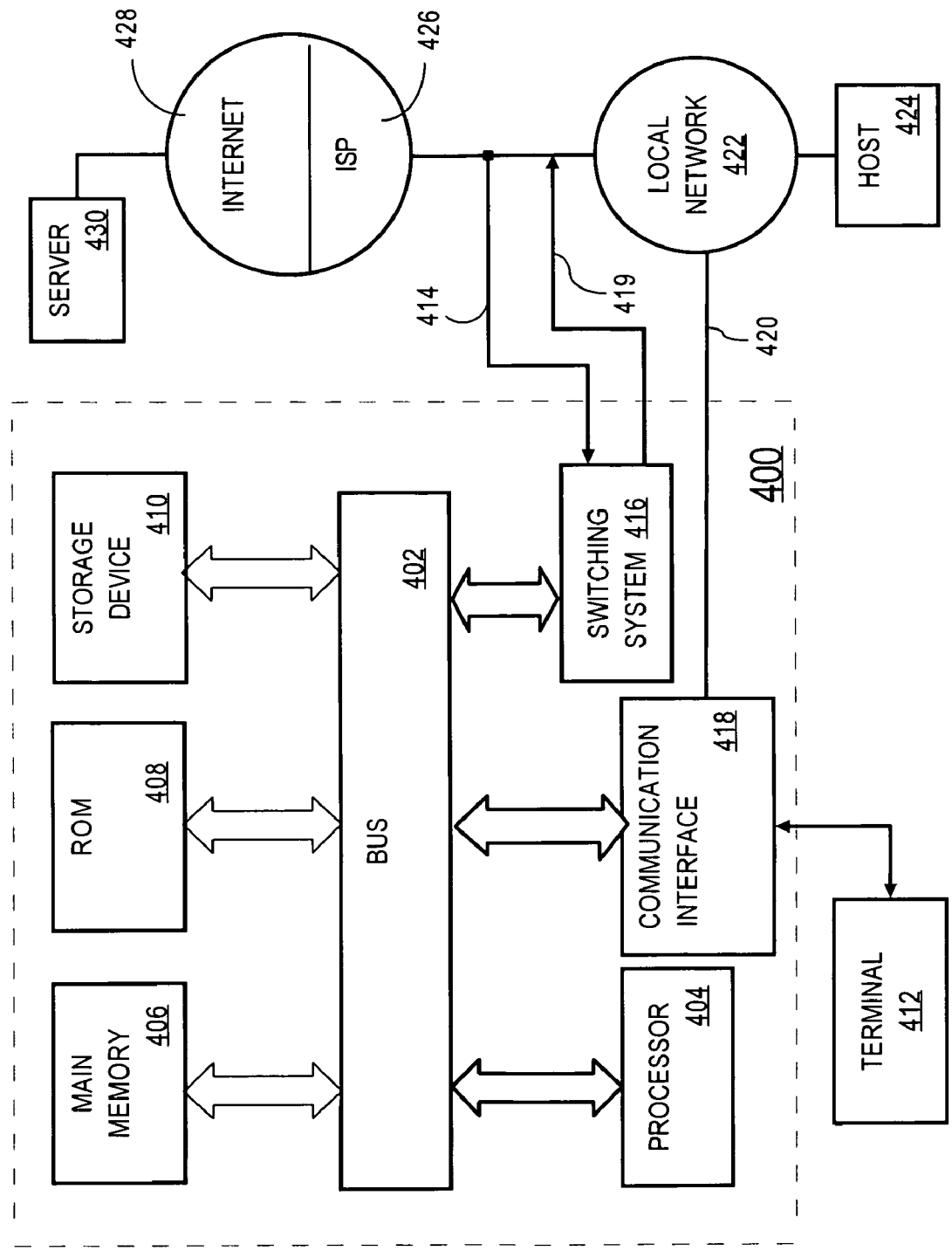
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for accelerating BGP route convergence. According to one embodiment of the invention, methods for identifying BGP routes and for accelerating BGP route convergence are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for accelerated BGP route convergence as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing routes in a Border Gateway Protocol (BGP) host, the method comprising the computer-implemented steps of:
    assigning a virtual link identifier to each link of a set of digital communication links established between the BGP host and one or more BGP peers;
    determining one or more routes that are reachable on a particular link of the set of digital communication links;
    creating and storing, in electronic digital memory, an association of the one or more routes with a BGP identifier of the BGP host and a particular virtual link identifier that is assigned to the particular link;
    advertising, in a first BGP message, the one or more routes to a particular BGP peer of the one or more BGP peers, wherein the first BGP message includes the BGP identifier and the particular virtual link identifier; and
    sending a second BGP message to the particular BGP peer, wherein the message indicates that the one or more routes are withdrawn and include the BGP identifier and the particular virtual link identifier.

2. A method as recited in claim 1, wherein the particular link is any one of a logical transport connection and a physical medium transport connection.

3. A method of accelerating route convergence in autonomous systems using Border Gateway Protocol (BGP), the method comprising the computer-implemented steps of:
    at a BGP host, performing the steps of:
        assigning separate virtual link identifiers to each link of a set of communication links established between the BGP host and one or more network elements in one or more networks;
        determining one or more routes that are reachable on a particular link of the set of communication links; and
        associating the one or more routes with a BGP identifier and a virtual link identifier assigned to the particular link, wherein the BGP identifier identifies the BGP host;
    advertising, in a first message, the one or more routes to a BGP peer, wherein the first message includes the BGP identifier and the virtual link identifier;
    determining whether the particular link has become unavailable;
    if the particular link has become unavailable, then sending to the BGP peer a second message that includes the BGP identifier and the virtual link identifier, wherein the second message indicates that the one or more routes are withdrawn.

4. A method as recited in claim 3, wherein:
    the one or more routes are each associated with separate address prefixes; and
    the second message does not include any address prefix associated with the one or more routes.

5. A method as recited in claim 3, further comprising:
at the BGP peer, receiving the second message; and
based on the BGP identifier and the virtual link identifier, withdrawing the one or more routes.

6. A method as recited in claim 3, wherein:
each route of the one or more routes is associated with an address prefix;
advertising the one or more routes further comprises including in the first message the address prefix associated with each route;
in response to receiving the first message at the BGP peer, storing the one or more routes in a routing table, wherein storing includes recording the address prefix, the BGP identifier, and the virtual link identifier associated with each route of the one or more routes; and
in response to receiving the second message at the BGP peer, performing the steps of
identifying the one or more routes based only on the BGP identifier and the virtual link identifier; and
withdrawing the one or more routes, wherein withdrawing comprises at least one of deleting the one or more routes from the routing table and setting a status code, for each route of the one or more routes, which indicates that each route is withdrawn.

7. A method as recited in claim 6, wherein:
the BGP peer is a BGP route reflector; and
the method further comprises sending, to a particular BGP peer of the BGP route reflector, a third message that indicates to the particular BGP peer that the one or more routes are withdrawn.

8. A method as recited in claim 7, wherein the third message includes the BGP identifier and the virtual link identifier.

9. A method as recited in claim 7, wherein the third message includes the address prefix associated with each route of the one or more routes.

10. A method as recited in claim 3, wherein:
the first message is a BGP UPDATE message; and
advertising the one or more routes to the BGP peer further comprises storing the BGP identifier and the virtual link identifier in a path attribute field of the first message.

11. A method as recited in claim 3, wherein:
in addition of being reachable on the particular link, the one or more routes are reachable on a specific link of the set of communication links that is different than the particular link;
the step of associating the one or more routes further comprises associating the one or more routes with the BGP identifier and a specific virtual link identifier assigned to the specific link; and
the step of advertising the one or more routes further comprises including the specific virtual identifier in the first message.

12. A method as recited in claim 3, further comprising:
as part of establishing a BGP session, negotiating an accelerated BGP convergence capability between the BGP host and the BGP peer, wherein the accelerated BGP convergence capability is defined by an Address Family Identifier (AFI) value and a Subsequent Address Family Identifier (SAFI) value; and
wherein the second message further includes the AFI value and the SAFI value.

13. A method as recited in claim 12, wherein the second message is a BGP UPDATE message.

14. A method as recited in claim 3, further comprising:
storing a message counter in a path attribute field of any message sent by the BGP host, wherein the value of the message counter is incremented every time the BGP host sends a new message;
in response to receiving a particular message at a BGP peer, determining whether the one or more routes advertised in the particular message are stored at the BGP peer, wherein the particular message is any one of the first message and the second message;
if it is determined that the one or more routes are not stored at the BGP peer, then storing the value of the message counter in a routing table, wherein the value of the message counter is associated with the one or more routes advertised in the particular message; and
if it is determined that the one or more are stored at the BGP peer, then dropping the particular message if the value of the message counter received in the particular message is lower than the value of the message counter that is stored in the routing table for the one or more routes advertised in the particular message.

15. A method as recited in claim 14, wherein the path attribute field is a BGP extended community attribute field.

16. A method as recited in claim 3, wherein the BGP peer is established in a different autonomous system than the BGP host and at least one of the steps of advertising the one or more routes to the BGP peer and sending the second message to the BGP peer is performed over an external Border Gateway Protocol (eBGP) transport connection.

17. A method as recited in claim 3, wherein:
the BGP peer is established in the same autonomous system as the BGP host; and
at least one of the steps of advertising the one or more routes to the BGP peer and sending the second message to the BGP peer is performed over an Internal Gateway Protocol (IGP) transport connection.

18. A method as recited in claim 3, wherein:
the BGP peer is established in the same autonomous system as the BGP host; and
at least one of the steps of advertising the one or more routes to the BGP peer and sending the second message to the BGP peer is performed over an internal Border Gateway Protocol (iBGP) transport connection.

19. A method as recited in claim 3, wherein each route of the one or more routes is at least one of an Internet Protocol version 4 (IPv4) route, an Internet Protocol version 6 (IPv6) route, and a Virtual Private Network (VPN) route.

20. A method as recited in claim 3, wherein:
the one or more routes include a first route to a particular address destination; and
the method further comprises the steps of:
at the BGP peer, receiving a third message that advertises a second route to the particular address destination, wherein the second route is different than the first route; and
re-advertising the first route and the second route to a BGP neighbor of the BGP peer.

21. A method as recited in claim 3, further comprising, in response to receiving the second message at the BGP peer, withdrawing the one or more routes, wherein the one or more routes are identified based only on the BGP identifier.

22. A method as recited in claim 3, wherein:
the BGP host runs a plurality of BGP instances; and
the step of associating further comprises associating the one or more routes with a plurality of distinct BGP identifiers, wherein each distinct BGP identifier corresponds to a distinct BGP instance of the plurality of BGP instances, and wherein the BGP identifier is one of the plurality of distinct BGP identifiers.

23. A method as recited in claim 3, wherein:
the virtual link identifier comprises a first portion and a second portion;
the first portion uniquely identifies a network interface of the BGP host;
the second portion identifies a network element of the one or more network elements, wherein the network element is communicatively connected to the network interface over the particular link; and
the method further comprises, in response to receiving the second message at the BGP peer, withdrawing the one or more routes, wherein the one or more routes are identified based on any one of the first portion of the virtual link identifier and the second portion of the virtual link identifier.

24. A method as recited in claim 3, wherein determining whether the particular link has become unavailable comprises at least one of:
(a) detecting whether a BGP instance running on the BGP host has become unavailable;
(b) detecting whether a transport connection over which the particular link is established has failed, wherein the transport connection is established between the BGP host and a particular network element of the one or more network elements; and
(c) detecting whether the particular network element has failed.

25. A network element, comprising:
one or more processors;
one or more stored sequences of instructions which, when executed by the one or more processors, cause the one or more processors to perform the steps of:
executing a Border Gateway Protocol (BGP) instance;
assigning a virtual link identifier to each link of a set of digital communication links established between the BGP instance and one or more BGP peers;
determining one or more routes that are reachable on a particular link of the set of digital communication links;
creating and storing, in electronic digital memory, an association of the one or more routes with a BGP identifier of the BGP instance and a particular virtual link identifier that is assigned to the particular link;
advertising, in a first BGP message, the one or more routes to a particular BGP peer of the one or more BGP peers, wherein the first BGP message includes the BGP identifier and the particular virtual link identifier; and
sending a second BGP message to the particular BGP peer, wherein the message indicates that the one or more routes are withdrawn and include the BGP identifier and the particular virtual link identifier.

26. A storage device or memory storing one or more sequences of instructions for managing routes in a Border Gateway Protocol (BGP) host, which instructions, when executed by one or more processors, cause the one or more processors to perform the steps of:
assigning a virtual link identifier to each link of a set of digital communication links established between the BGP host and one or more BGP peers;
determining one or more routes that are reachable on a particular link of the set of communication links;
creating and storing, in electronic digital memory, an association of the one or more routes with a BGP identifier of the BGP host and a particular virtual link identifier that is assigned to the particular link;
advertising, in a first BGP message, the one or more routes to a particular BGP peer of the one or more BGP peers, wherein the first BGP message includes the BGP identifier and the particular virtual link identifier; and
sending a second BGP message to the particular BGP peer, wherein the message indicates that the one or more routes are withdrawn and include the BGP identifier and the particular virtual link identifier.

27. A storage device or memory storing one or more sequences of instructions for accelerating route convergence in a Border Gateway Protocol (BGP) host, which instructions, when executed by one or more processors, cause the one or more processors to perform the steps of:
assigning separate virtual link identifiers to each link of a set of communication links established between the BGP host and one or more network elements in one or more networks;
storing one or more routes that are reachable on a particular link of the set of communication links;
associating the one or more routes with a BGP identifier and a virtual link identifier assigned to the particular link, wherein the BGP identifier identifies the BGP host;
advertising, in a first message, the one or more routes to a BGP peer, wherein the first message includes the BGP identifier and the virtual link identifier;
determining whether the particular link has become unavailable;
if the particular link has become unavailable, then sending to the BGP peer a second message that includes the BGP identifier and the virtual link identifier, wherein the second message indicates that the one or more routes are withdrawn.

28. A network element, comprising:
one or more processors;
one or more stored sequences of instructions which, when executed by the one or more processors, cause the one or more processors to perform the step of:
executing a Border Gateway Protocol (BGP) instance;
assigning separate virtual link identifier to each link of a set of communication links established between the BGP instance and one or more networks elements in one or more networks;
determining one or more routes that are reachable on a particular link of the set of communication links;
associating the one or more routes with a BGP identifier and a virtual link identifier assigned to the particular link, wherein the BGP identifier identifies the BGP instance;
advertising, in a first message, the one or more routes to a BGP peer, wherein the first message includes the BGP identifier and the virtual link identifier;
determining whether the particular link has become unavailable;
if the particular link has become unavailable, then sending to the BGP peer a second message that includes the BGP identifier and the virtual link identifier, wherein the second message indicates that the one or more routes are withdrawn.

29. The network element as recited in claim 28, wherein:
the one or more routes are each associated with separate address prefixes; and
the second message does not include any address prefix associated with one or more routes.

30. The network element as recited in claim 28, wherein the second message causes the BGP peer to withdraw the one or more routes based on the BGP identifier and the virtual link identifier.

31. The network as recited in claim 28, wherein:
each route of the one or more routes is associated with an address prefix;
the instructions that cause the one or more processors to perform the step of advertising the one or more routes further comprises instructions which, when executed by the one or more processors, cause the one or more processors to perform the step of including in the first message the address prefix associated with each route;
the first message causes the BGP peer to store the one or more routes in a routing table by storing the address prefix, the BGP identifier, and the virtual link identifier associated with each route of the one or more routes; and
the second message causes the BGP peer to:
identify the one or more routes based only on the BGP identifier and the virtual link identifier; and
withdrawn the one or more routes by at least one of deleting the one or more routes from the routing table and setting a status code, for each route of the one or more routes, which indicates that each route is withdrawn.

32. The network element as recited in claim 31, wherein the BGP peer is a BGP route reflector.

33. The network element as recited in claim 28, wherein:
the first message is a BGP UPDATE message; and
the instructions that cause the one or more processors to perform the step of advertising the one or more routes to the BGP peer further comprise instructions which, when executed by the one or more processors, cause the one or more processors to perform the step of storing the BGP identifier and the virtual link identifier in a path attribute field of the first message.

34. The network element as recited in claim 28, wherein:
in addition of being reachable on the particular link, the one or more routes are reachable on a specific link of the set of communication links that is different than the particular link;
the instructions that cause the one or more processors perform the step of associating the one or more routes further comprise instructions which, when executed by the one or more processors, cause the one or more processors to perform the step of associating the one or more routes with the BGP identifier and a specific virtual link identifier assigned to the specific; and
the instructions that cause the one or more processors to perform the step of advertising the one or more routes further comprise instructions which, when executed by the one or more processors, cause the one or more processors to perform the step of including the specific virtual identifier in the first message.

35. The network element as recited in claim 28, wherein the one or more stored sequences of instructions further comprise instructions which, when executed by the one or more processors, cause the one or more processors to perform the step of:
as part of establishing a BGP session, negotiating an accelerated BGP convergence capability between the BGP instance and the BGP peer, wherein the accelerated BGP convergence capability is defined by an Address Family Identifier (AFI) value and a Subsequent Address Family Identifier (SAFI) value;
wherein the second message further includes the AFI value and the SAFI value.

36. The network element as recited in claim 28, wherein the BGP peer is established in a different autonomous system than the BGP instance.

37. The network element as recited in claim 28, wherein each route of the one or more routes is at least one of an Internet Protocol version 4 (IPv4) route, an Internet Protocol version 6 (IPv6)route, and a Virtual Private Network (VPN) route.

38. The network element as recited in claim 28, wherein:
the network element runs a plurality of BGP instances that include the BGP instance; and
the instructions that cause the one or more processors to perform the step of associating further comprise instruction which, when executed by the one or more processors, cause the one or more processors to perform the step of associating the one or more routes with a plurality of distinct BGP identifiers, wherein each distinct BGP identifier corresponds to a distinct BGP instance of the plurality of BGP instances, and wherein the BGP identifies is one of the plurality of distinct BGP identifiers.

39. The network element as recited in claim 28, wherein the instruction that cause the one or more processors to perform the step of determining whether the particular link has become unavailable comprise instructions which, when executed by the one or more processors, cause the one or more processors to perform at least one of the steps of:
(a) detecting whether the BGP instances has become unavailable;
(b) detecting whether a transparent connection over which the particular link is established has failed, wherein the transport connection is established between the BGP instance and a particular network element of the one or more network element;
(c) detecting whether the particular network element has failed.

* * * * *

UNITED STATES PATENT AND TRADEMARK OFFICE
CERTIFICATE OF CORRECTION

PATENT NO. : 7,532,631 B2  Page 1 of 1
APPLICATION NO. : 11/106414
DATED : May 12, 2009
INVENTOR(S) : Robert Raszuk et al.

It is certified that error appears in the above-identified patent and that said Letters Patent is hereby corrected as shown below:

In column 23, line 54, claim 25, delete "include" and insert -- includes --.

In column 25, line 10, claim 31, delete "comprises" and insert -- comprise --.

In column 25, line 21, claim 31, delete "withdrawn" and insert -- withdraw --.

In column 25, lines 42 and 43, claim 34, delete "processors perform" and insert -- processors to perform --.

In column 25, line 48, claim 34, delete "specific," and insert -- specific link, --.

In column 26, line 37, claim 39, delete "instruction" and insert -- instructions --.

In column 26, line 42, claim 39, delete "instances" and insert -- instance --.

In column 26, line 44, claim 39, delete "transparent" and insert -- transport --.

Signed and Sealed this

Twelfth Day of October, 2010

David J. Kappos
*Director of the United States Patent and Trademark Office*